United States Patent
Hemphill et al.

(10) Patent No.: US 10,288,130 B2
(45) Date of Patent: May 14, 2019

(54) EXPANDABLE PISTON ASSEMBLY (71) Applicant: Schaeffler Technologies AG & Co. KG, Herzogenaurach (DE)

(72) Inventors: Jeffrey Hemphill, Copley, OH (US); Vural Ari, Peabody, MA (US); Philip George, Wooster, OH (US); Matthias Kruse, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 196 days.

(21) Appl. No.: 15/300,170

(22) PCT Filed: Mar. 27, 2015

(86) PCT No.: PCT/US2015/023085
§ 371 (c)(1),
(2) Date: Sep. 28, 2016

(87) PCT Pub. No.: WO2015/148973
PCT Pub. Date: Oct. 1, 2015

(65) Prior Publication Data
US 2017/0211635 A1    Jul. 27, 2017

Related U.S. Application Data

(60) Provisional application No. 61/971,756, filed on Mar. 28, 2014, provisional application No. 62/087,222, filed on Dec. 3, 2014.

(51) Int. Cl.
*F16D 25/0638* (2006.01)
*F16D 13/70* (2006.01)
(Continued)

(52) U.S. Cl.
CPC .......... *F16D 25/0638* (2013.01); *F15B 15/12* (2013.01); *F16D 13/52* (2013.01);
(Continued)

(58) Field of Classification Search
None
See application file for complete search history.

(56) References Cited

U.S. PATENT DOCUMENTS 5,749,451 A * 5/1998 Grochowski ....... F16D 25/0638
188/196 P
6,264,009 B1   7/2001 Johnson
(Continued)

FOREIGN PATENT DOCUMENTS

JP    2006118599 A    5/2006
JP    2012137169 A    7/2012

OTHER PUBLICATIONS

International Search Report and Opinion for PCT/US2015/023085; 8 pgs; dated Jun. 30, 2015 by the Korean Intellectual Property Office.

*Primary Examiner* — Mark A Manley
(74) *Attorney, Agent, or Firm* — Lekeisha M. Suggs (57) ABSTRACT

An expandable piston assembly for a clutch pack includes an apply piston, a stator, a rotor, and at least one side cover fixed to the stator. The stator is fixed to the apply piston and includes a first arcuate segment and a first radial protrusion extending from the first arcuate segment and including a distal end. The rotor is axially aligned with and rotatable relative to the stator. The rotor includes a second arcuate segment extending proximate the first radial protrusion distal end and a second radial protrusion extending from the second arcuate segment and including a distal end proximate the first arcuate segment. In some example embodiments, the first and second arcuate segments, the first and second radial protrusions, and the at least one side cover collectively form a portion of a first chamber for receiving a pressurized hydraulic fluid to rotate the rotor relative to the stator.

5 Claims, 13 Drawing Sheets

(51) Int. Cl.
*F16D 13/52* (2006.01)
*F16D 25/12* (2006.01)
*F16D 23/12* (2006.01)
*F15B 15/12* (2006.01)

(52) U.S. Cl.
CPC .............. *F16D 13/70* (2013.01); *F16D 23/12* (2013.01); *F16D 25/12* (2013.01); *F16D 2023/123* (2013.01)

(56) References Cited

U.S. PATENT DOCUMENTS

| | | | |
|---|---|---|---|
| 6,948,604 B2 * | 9/2005 | Puiu | B60K 17/344 |
| | | | 180/249 |
| 6,971,494 B2 * | 12/2005 | Puiu | F16D 43/216 |
| | | | 180/249 |
| 8,813,937 B2 | 8/2014 | Hemphill | |
| 2003/0168306 A1 * | 9/2003 | Gorman | F16D 25/0638 |
| | | | 192/85.25 |
| 2004/0011603 A1 | 1/2004 | Yokoyama et al. | |
| 2006/0019788 A1 | 1/2006 | Morgensai | |
| 2012/0234646 A1 | 9/2012 | Hemphill | |

* cited by examiner

EXPANDABLE PISTON ASSEMBLY

FIELD

The invention relates generally to a piston assembly for a clutch pack, and more specifically to an expandable piston assembly with a vaned actuator.

BACKGROUND

Travel compensating pistons for clutch packs are known. One example with rotary pistons is shown in commonly-assigned United States Patent Publication No. 2012/0234646.

BRIEF SUMMARY

Example embodiments broadly comprise an expandable piston assembly for a clutch pack including an apply piston, a stator, a rotor, and at least one side cover fixed to the stator. The stator is fixed to the apply piston and includes a first arcuate segment and a first radial protrusion extending from the first arcuate segment and including a distal end. The rotor is axially aligned with and rotatable relative to the stator. The rotor includes a second arcuate segment extending proximate the first radial protrusion distal end and a second radial protrusion extending from the second arcuate segment and including a distal end proximate the first arcuate segment. In some example embodiments, the first and second arcuate segments, the first and second radial protrusions, and the at least one side cover collectively form a portion of a first chamber for receiving a pressurized hydraulic fluid to rotate the rotor relative to the stator.

In some example embodiments, the stator includes a third radial protrusion with a distal end proximate the second arcuate segment and the rotor includes a fourth radial protrusion with a distal end proximate the first arcuate segment. The first and second arcuate segments, the first and fourth radial protrusions or the second and third radial protrusions, and the at least one side cover collectively form a portion of a second chamber. In an example embodiment, the expandable piston assembly has a spring disposed in the second chamber. In an example embodiment, the at least one side cover includes first and second side covers disposed on axially opposite sides of the stator, the apply piston and the first side cover include holes for flowing the pressurized hydraulic fluid into the first chamber, and the second side cover includes holes for the flowing hydraulic fluid out of the second chamber.

In some example embodiments, the expandable piston assembly has a compensation dam and the at least one side cover includes a cylindrical ring sealed to the compensation dam. In an example embodiment, the piston includes axially extending tabs in contact with the compensation dam.

In some example embodiments, the expandable piston assembly has an adjuster ring and a pressure plate. The adjuster ring is rotationally connected to the rotor and includes a first axially-extending ramp. The pressure plate includes a second axially-extending ramp aligned with the first axially-extending ramp. In an example embodiment, the adjuster ring and the rotor are rotationally connected by rotor protrusions installed in adjuster ring slots and the pressure plate includes radially outer teeth for engaging an inner spline of a clutch carrier.

Other example aspects broadly comprise a clutch pack assembly for an automatic transmission including a clutch pack carrier and a piston assembly. The clutch pack carrier has an internal spline. The piston assembly has a piston plate sealed to the clutch pack carrier, a side plate fixed to the piston plate, and a vaned actuator installed between the piston plate and the side plate. The vaned actuator has an inner ring with radially outwardly protruding segments and an outer ring with radially inwardly protruding segments. In some example embodiments, one of the inner ring or the outer ring is fixed to the piston plate and the other of the inner ring or the outer ring is rotatable relative to the piston plate. In an example embodiment, the clutch pack assembly includes an adjuster ring rotationally fixed to the other of the inner ring or the outer ring and a pressure plate with radially outer teeth rotationally fixed to and axially moveable relative to the clutch pack carrier inner spline.

In some example embodiments, the side plate and inner and outer rings form at least a portion of plurality of chambers, one of the plurality of chambers is connectable with a hydraulic pressure source via flow holes in the piston plate, and another of the plurality of chambers is connectable with a hydraulic sump via flow holes in the side plate. In an example embodiment, the clutch pack assembly has a spring disposed in one of the plurality of chambers.

In some example embodiments, the clutch pack assembly has a compensation dam. The clutch pack carrier includes an axially extending tubular section, and the piston plate and the compensation dam are installed on the tubular section. In an example embodiment, the side plate includes a rim sealed to the compensation dam. In some example embodiments, the piston plate includes an inner rim installed on the clutch pack carrier tubular section, and axially protruding tabs extending from the inner rim and in contact with the compensation dam. In an example embodiment, the tubular section includes a first flow hole exiting the tubular section between the inner rim and the compensation dam, and a second flow hole exiting the tubular section on a back side of the piston plate, opposite the inner rim.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
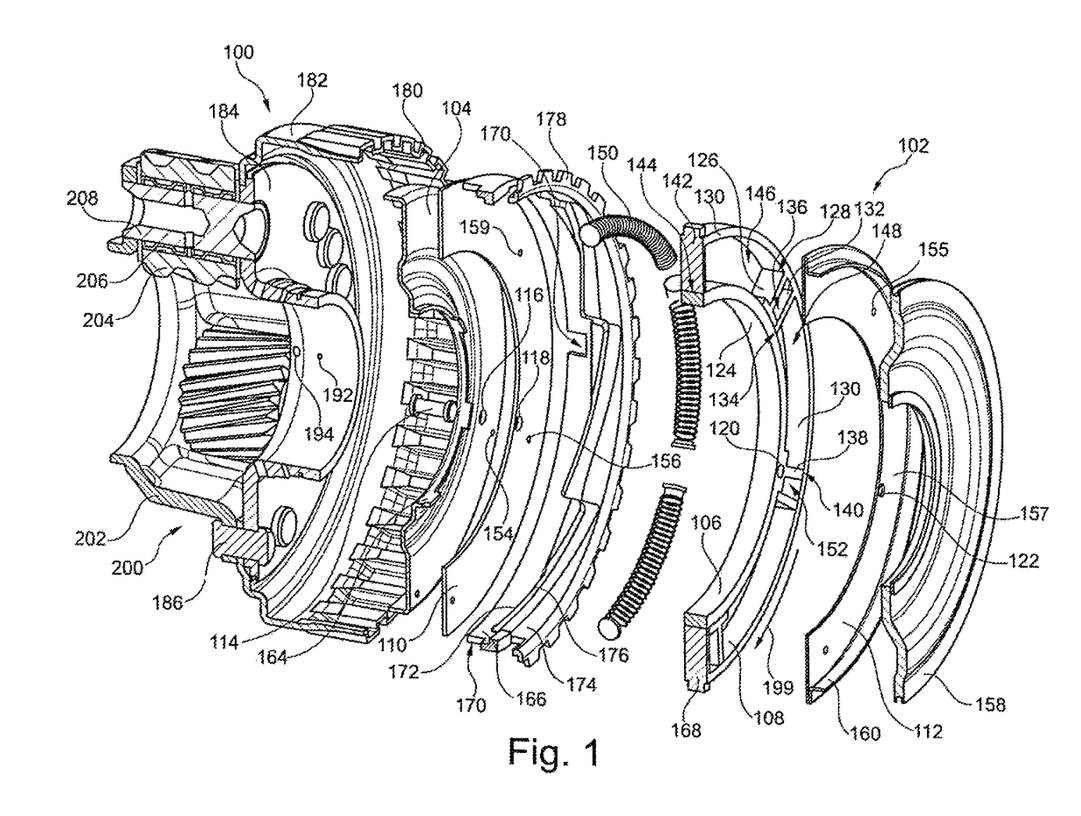
FIG. 1 is an exploded perspective view of a clutch pack with an expandable piston assembly and a planet carrier according to an example aspect.

The following description is made with reference to FIG. 1. FIG. 1 is an exploded perspective view of clutch pack 100 with expandable piston assembly 102 and planet carrier 200 according to an example aspect. Expandable piston assembly 102 includes apply piston 104, stator 106, rotor 108, and side covers 110 and 112. Side covers 110 and 112 are disposed on axially opposite sides of stator 106. In some embodiments (not shown), the function of side cover 110 is performed by piston 104. That is, piston 104 can be extended radially outward and folded similar to side cover 112 to eliminate side cover 110. Rivets 114 are disposed in apertures 116, 118, 120, and 122 in piston 104, side cover 110, stator 106, and side cover 112, respectively, fixing the components together. That is, the stator is fixed to the apply piston.

Clutch pack 100 includes a vaned actuator comprising the stator and a rotor. Stator, or inner ring, 106 includes arcuate segment 124 and radial protrusion 126 extending from the arcuate segment. Protrusion 126 protrudes radially outward and includes distal end 128. Rotor, or outer ring, 108 is axially aligned with and rotatable relative to stator 106. Rotor 108 includes radially inwardly protruding segment 132. In some embodiments (not shown), the outer ring 108 is fixed to the piston and inner ring 106 is rotatable.

That is, stator 106 and rotor 108 are axially retained by side plates 110 and 112 such that they are aligned. Furthermore, the rotor and stator are not fixed together so that, when the stator is restricted from rotation, the rotor can still rotate as described below. Rotor 108 includes arcuate segment 130 extending proximate distal end 128 and radial protrusion 132 extending from arcuate segment 130 and including distal end 134 proximate arcuate segment 124.

Figure 2:
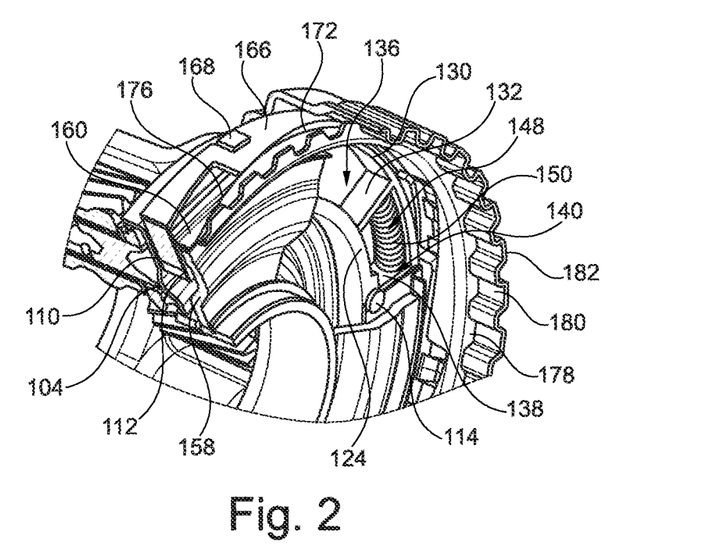
FIG. 2 is a perspective cutaway view of the clutch pack of FIG. 1 shown in an axially-expanded state.
Figure 3:
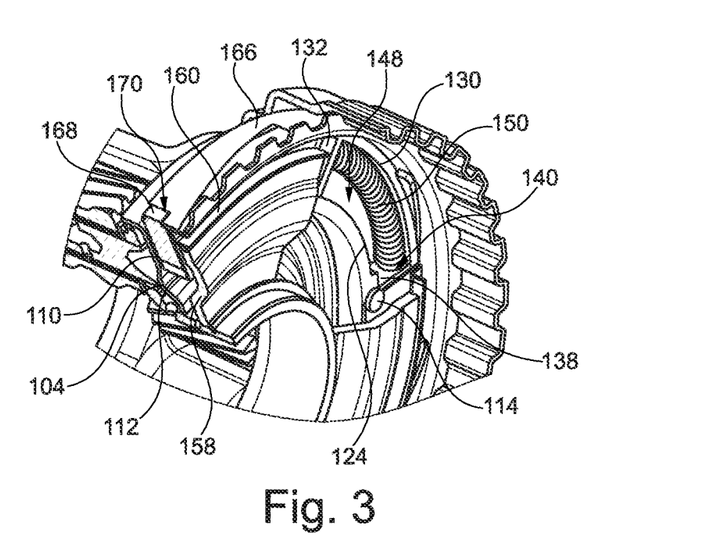
FIG. 3 is a perspective cutaway view of the clutch pack of FIG. 1 shown in an axially compressed state.

The following description is made with reference to FIGS. 1-3. FIG. 2 is a perspective cutaway view of clutch pack 100 shown in an axially-expanded state. FIG. 3 is a perspective cutaway view of clutch pack 100 shown in an axially compressed state. Arcuate segments 124 and 130, radial protrusions 126 and 132 and side covers 110 and 112 collectively form a portion of chamber 136 for receiving a pressurized hydraulic fluid, to rotate the rotor relative to the stator as described below.

Stator 106 includes radial protrusion 138 with distal end 140 proximate arcuate segment 130. Rotor 108 includes radial protrusion 142 with distal end 144 proximate arcuate segment 124. Arcuate segments 124 and 130, radial protrusions 126 and 142, and side covers 110 and 112 collectively form a portion of chamber 146. Arcuate segments 124 and 130, radial protrusions 132 and 138, and side covers 110 and 112 collectively form a portion of chamber 148. Springs 150 are disposed in chambers 146 and 148.

During operation of expandable piston assembly 102, pressurized hydraulic fluid may be introduced into chamber 152 through holes 154 and 156 in piston 104 and side plate 110, respectively. Similarly, fluid is introduced into chamber 136 through hole 159 in the side plate, and an aligned hole in the piston (not shown). Pressurized fluid in chambers 136 and 152 overcomes a spring force from springs 150 in chambers 146 and 148 to rotate the rotor relative to the stator and expand the piston assembly as described below. Similarly, side plate 112 includes holes 155 and 157, connected with chambers 146 and 148, respectively, for flowing hydraulic fluid out of the chambers if there is leakage between a radial protrusion and an arcuate segment, for example. Otherwise stated, side plates 110 and 112 and rings 124 and 130 form at least a portion of chambers 136, 146, and 148. Chamber 136 is connectable with a hydraulic pressure source via flow holes 154 in piston plate 104. Chambers 146 and 148 are connectable with a hydraulic sump via flow holes 157 in side plate 112.

Figure 4:
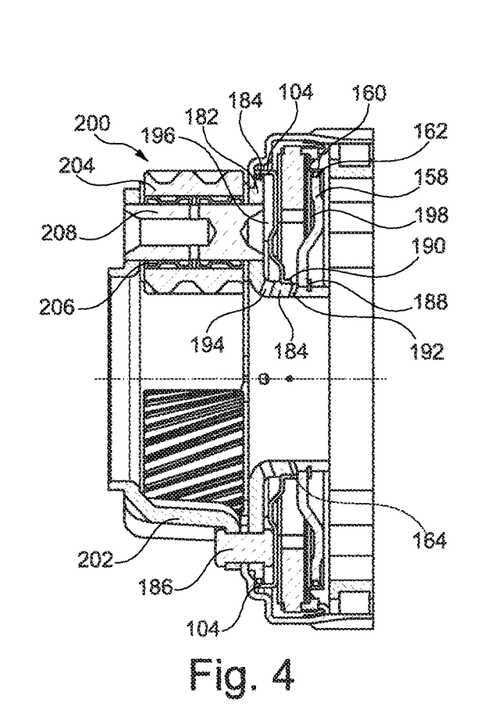
FIG. 4 is a cross section view of the clutch pack of FIG. 1.
Figure 5:
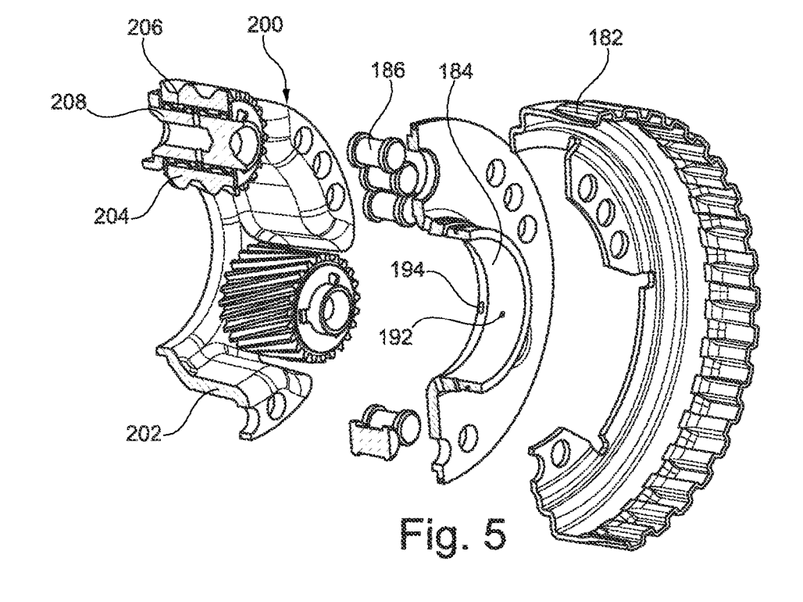
FIG. 5 is an exploded view of a clutch pack carrier of FIG. 1.

The following description is made with reference to FIGS. 1-5. FIG. 4 is a cross section view of clutch pack 100. FIG. 5 is an exploded view of the clutch pack carrier. Expandable piston assembly 102 includes compensation dam 158. Side cover 112 includes cylindrical ring 160 sealed to the compensation dam at seal 162 (FIG. 4), for example. Clutch pack carrier 182 includes axially extending tubular section 184 fixed to the carrier by rivets 186, for example. Piston plate 104 and compensation dam 158 are installed on tubular section 184. In an example embodiment, the piston and dam are press fitted onto the tubular section. Snap ring 188 axially retains the two components. Piston 104 includes axially extending tabs 164 in contact with the compensation dam. In other words, piston plate 104 includes inner rim 190 installed on clutch pack carrier tubular section 184, and axially protruding tabs 164 extending from the inner rim and in contact with the compensation dam. Tubular section 184 includes flow hole 192 exiting the tubular section between the inner rim and the compensation dam, and flow hole 194 exiting the tubular section on a back side of the piston plate, opposite the inner rim.

Expandable piston assembly 102 includes adjuster ring 166 rotationally connected to the rotor by rotor protrusions 168 installed in adjuster ring slots 170. Other embodiments, for example when the rotor is an inner ring (not shown), may include the adjuster ring fixed by radially inwardly extending protrusions, for example. Adjuster ring 166 includes axially-extending ramp 172. That is, the ramp changes its axial width in a circumferential direction so that a first axial width of the ramp is larger or smaller than a second axial width of the same ramp at a position circumferentially offset from the first axial width. Assembly 102 further includes pressure plate 174 including axially-extending ramp 176 aligned with axially-extending ramp 172. Pressure plate 174 includes radially outer teeth 178 for engaging inner spline 180 of clutch carrier, or clutch pack carrier, 182. Teeth 178 are rotationally fixed to and axially moveable relative to clutch pack carrier inner spline 180.

As best seen in FIG. 4, during an engagement of the clutch pack, pressurized hydraulic oil is introduced to chamber 196 between piston 104 and tubular section 182 through flow hole 194 in the tubular section. Low pressure oil is also introduced into chamber 198 between the piston and compensation dam 158 via flow hole 192. This keeps oil on both sides of the piston to negate any centrifugal effects that may operate on the piston. Pressurized oil in chamber 196 flows through holes 154 in the piston and 156 in the side plate into chamber 152. This pressure rotates rotor 108 in the direction of arrow 199 (FIG. 1) relative to the stator, piston, side plates, compensation dam, and clutch carrier.

Rotation of the rotor drives rotation of adjuster ring 166 relative to pressure plate 174 through protrusions 168 and slots 170. Pressure plate 174 is rotationally fixed to the clutch carrier by teeth 178 installed in spline 178. Relative rotation of the adjuster ring and pressure plate axially displaces the pressure plate away from the adjuster ring to rapidly close a clutch pack gap (not shown). Once closed, pressure on the piston plate clamps the clutch pack through the adjuster ring and pressure plate to fully engage the clutch. Ramps 172 and 176 can be designed with self locking angles such that friction prevents unwinding of the ramps at high axial loads. When pressure is removed, springs 150 rotate the adjuster ring in a direction opposite to arrow 199 (FIG. 1) so that the ramps nest and the pressure plate can move closer to the adjuster ring, opening the clutch.

Planet carrier 200 includes housing 202, planet gears 204, bearings 206, and pins 208. Carrier 200 is fixed to the tubular section and the clutch carrier by rivets 186.

Figure 6:
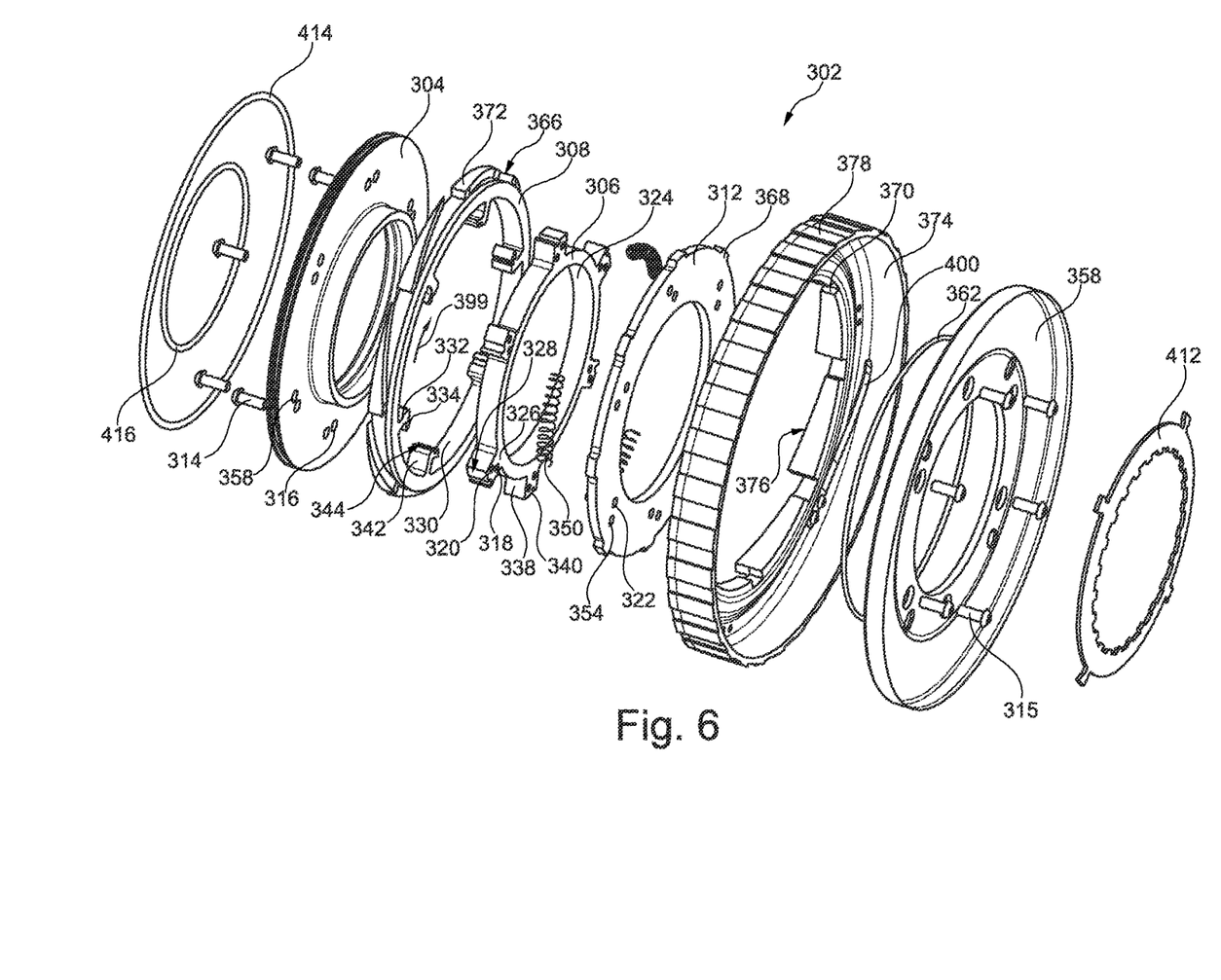
FIG. 6 is an exploded perspective view of an expandable piston assembly according to an example aspect.

The following description is made with reference to FIG. 6. FIG. 6 is an exploded perspective view of expandable piston assembly 302 according to an example aspect.

Expandable piston assembly 302 includes apply piston, or floating piston, 304, stator 306, rotor 308, and side cover 312. Piston 304 and side cover 312 are disposed on axially opposite sides of stator 306. Fasteners 314 are disposed in apertures 316 and 318 in piston 304 and stator 306, and fasteners 315 are disposed in apertures 320 and 322 in stator 306 and side cover 312, respectively, fixing the components together. That is, the stator is fixed to the apply piston and the side cover.

Expandable piston assembly 302 includes a vaned actuator comprising stator 306 and rotor 308. Stator, or inner ring, 306 includes arcuate segment 324 and radial protrusion, or vane, 326 extending from the arcuate segment. Protrusion 326 protrudes radially outward and includes distal end 328. Rotor, or outer ring, 308 is axially aligned with and rotatable relative to stator 306. Rotor 308 includes radially inwardly protruding segment, or vane, 332. In some embodiments (not shown), the outer ring 308 is fixed to the piston and inner ring 306 is rotatable.

That is, stator 306 and rotor 308 are axially retained by piston 304 and side plate 312 such that they are aligned. Furthermore, the rotor and stator are not fixed together so that, when the stator is restricted from rotation, the rotor can still rotate as described below. Rotor 308 includes arcuate segment 330 extending proximate distal end 328 and radial protrusion 332 extending from arcuate segment 330 and including distal end 334 proximate arcuate segment 324.

Figure 7:
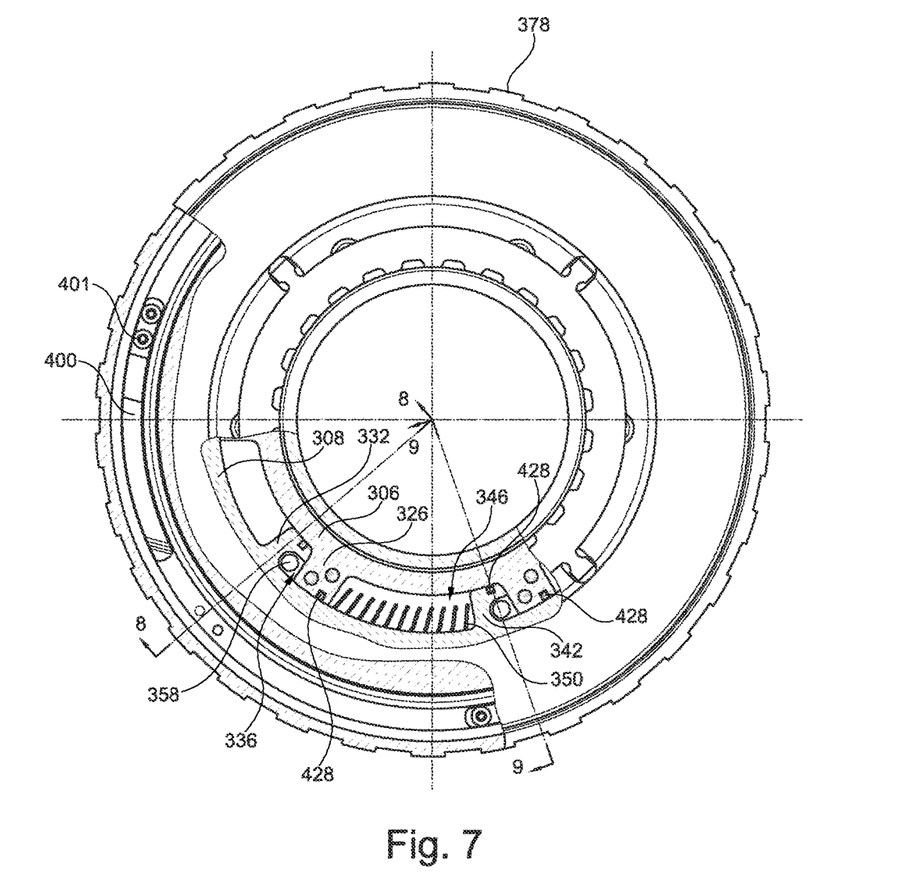
FIG. 7 is a partial cutaway side view of the expandable piston assembly of FIG. 6.
Figure 8:
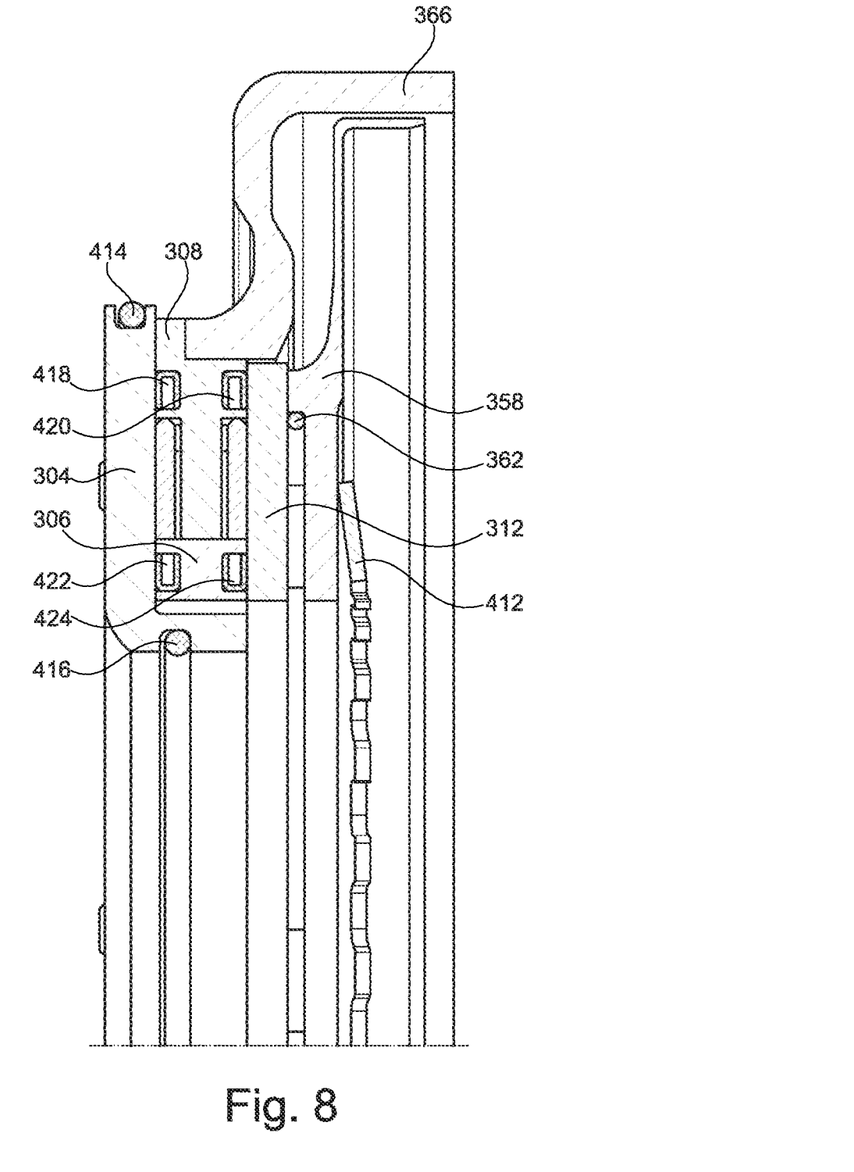
FIG. 8 is a cross section view of the expandable piston assembly of FIG. 6 taken generally along line 8-8 in FIG. 7.
Figure 9:
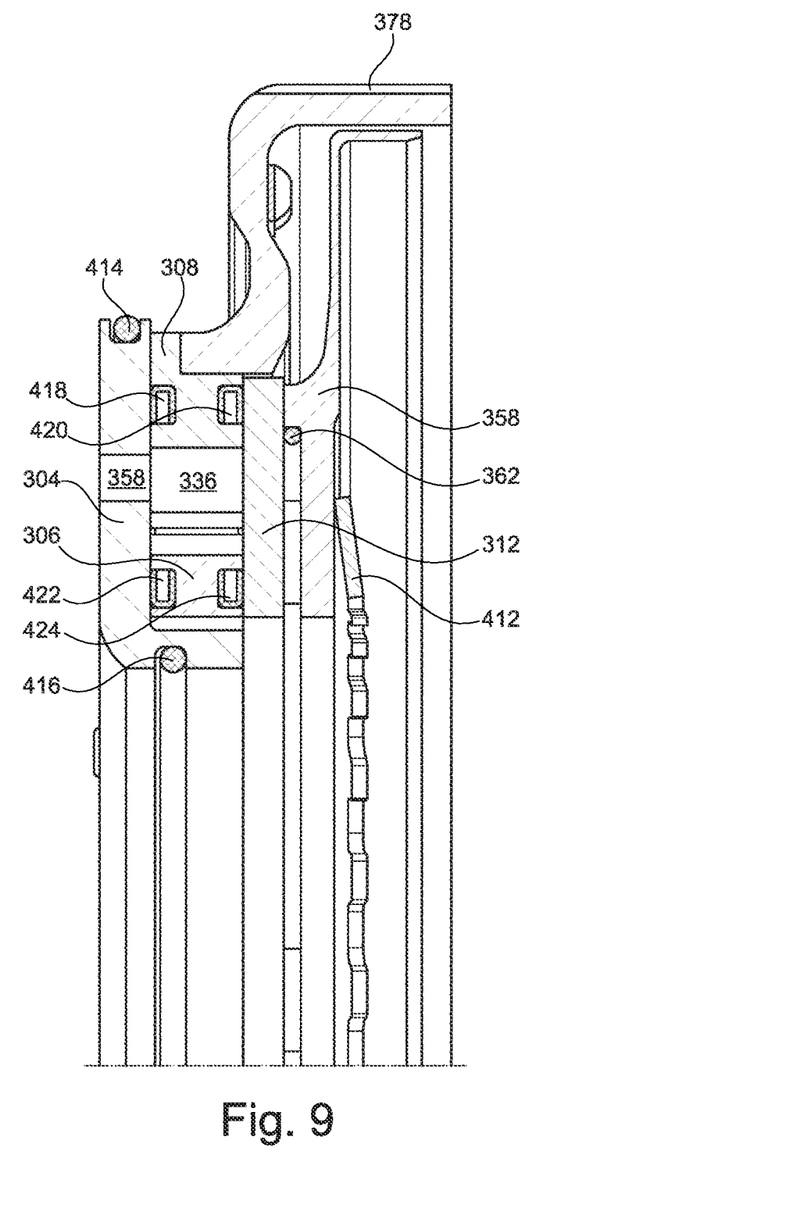
FIG. 9 is a cross section view of the expandable piston assembly of FIG. 6 taken generally along line 9-9 in FIG. 7.
Figure 10:
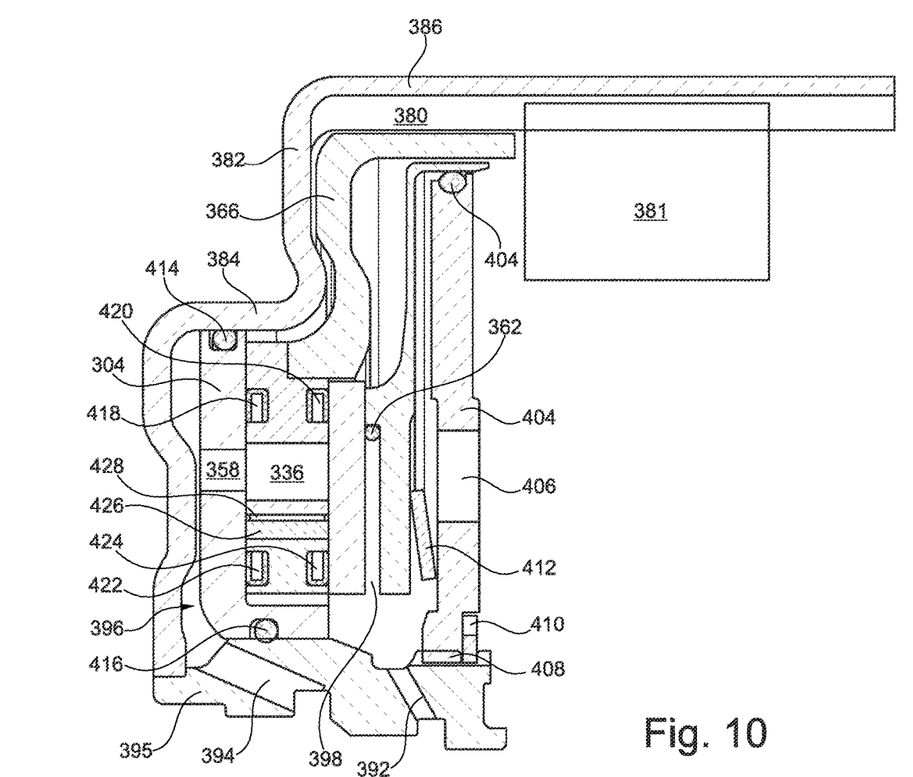
FIG. 10 is a cross section view of the expandable piston assembly of FIG. 9 shown installed in a transmission.
Figure 11:
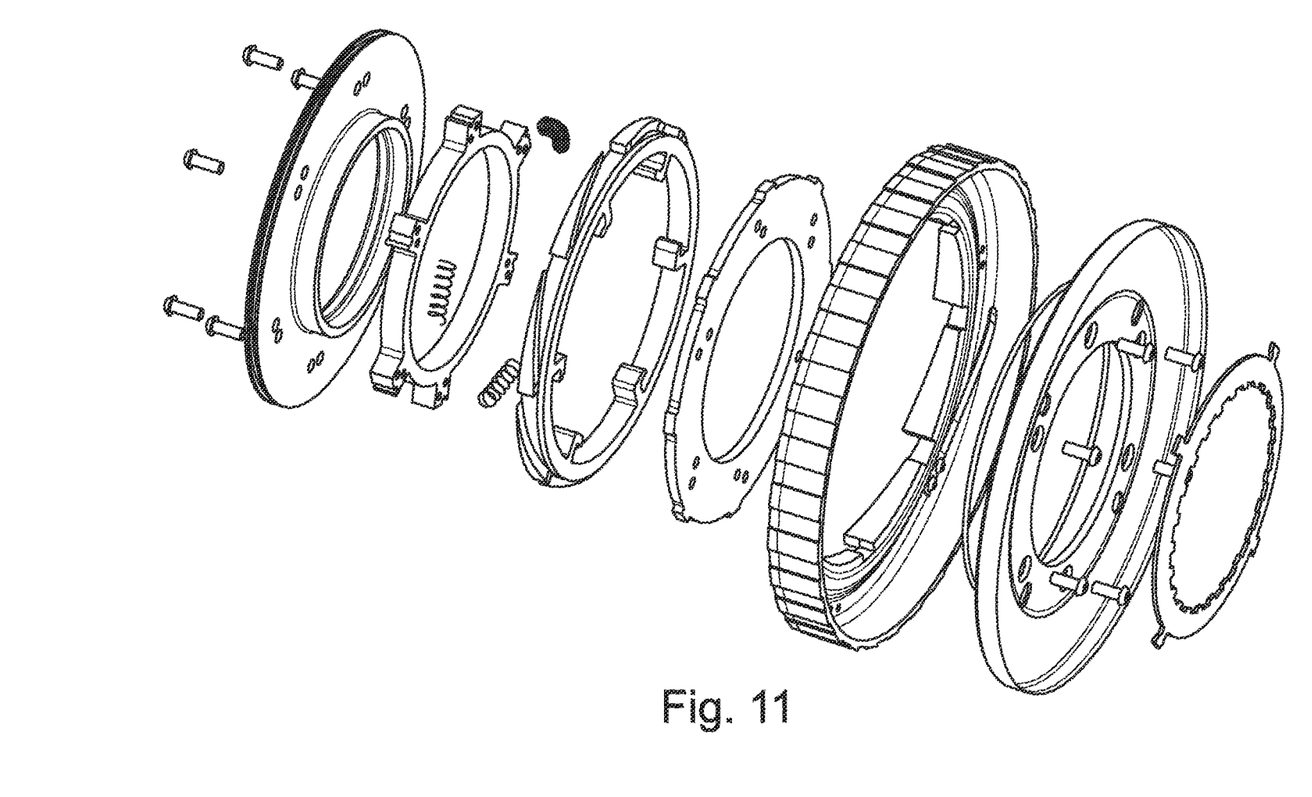
FIG. 11 is an exploded perspective view of the expandable piston assembly of FIG. 6.
Figure 12:
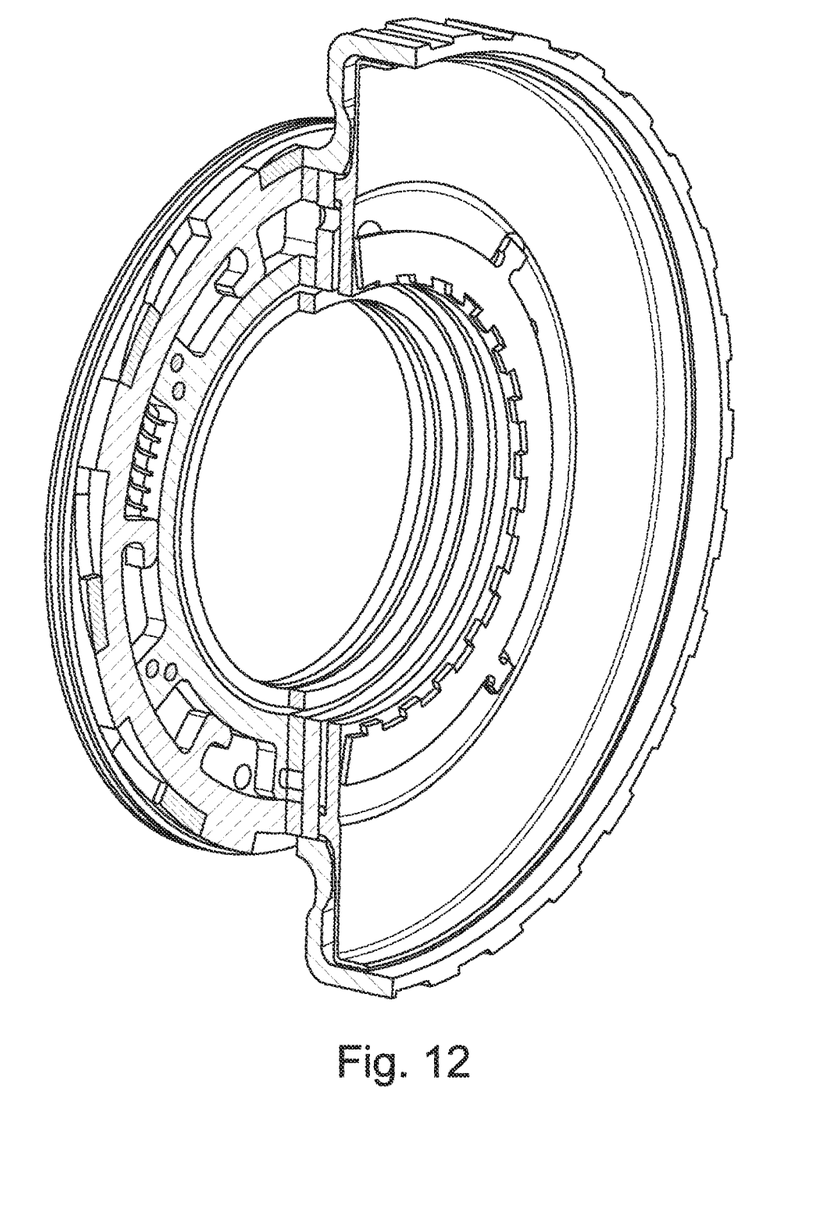
FIG. 12 is a partial section perspective view of the expandable piston assembly of FIG. 6.
Figure 13:
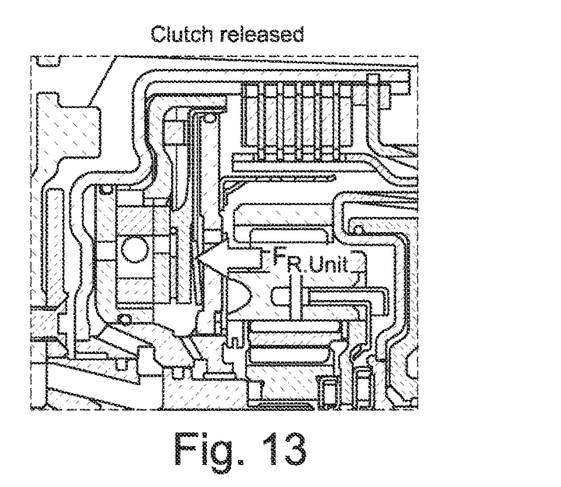
FIG. 13 is a cross section view of the expandable piston assembly of FIG. 6 shown installed in a transmission in a release state.
Figure 14:
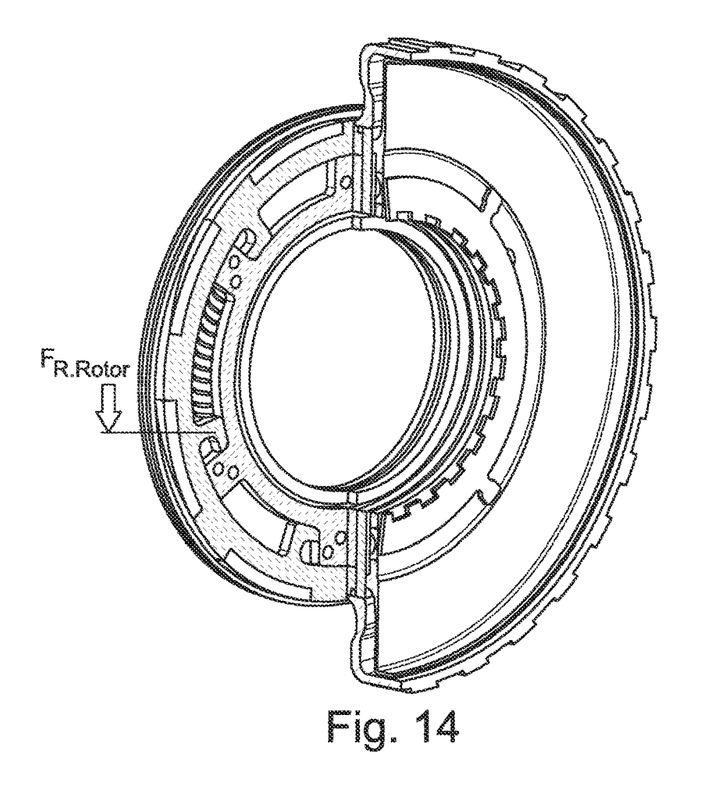
FIG. 14 is a partial section perspective view of the expandable piston assembly of FIG. 6 shown in a release state.
Figure 15:
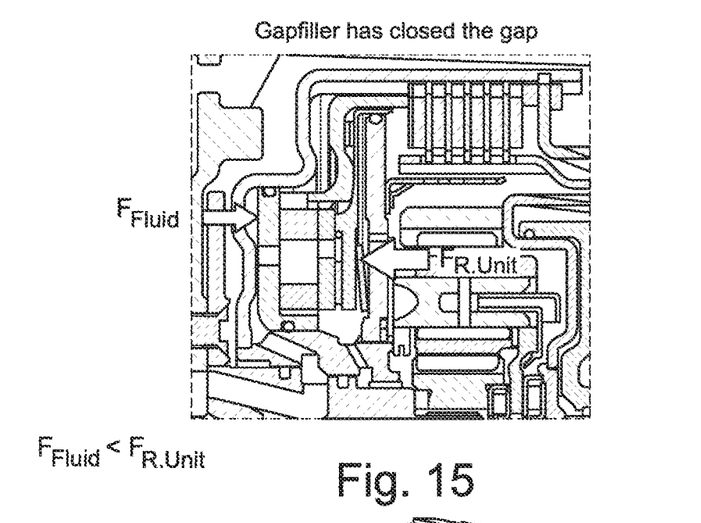
FIG. 15 is a cross section view of the expandable piston assembly of FIG. 6 shown installed in a transmission in a closed gap state.
Figure 16:
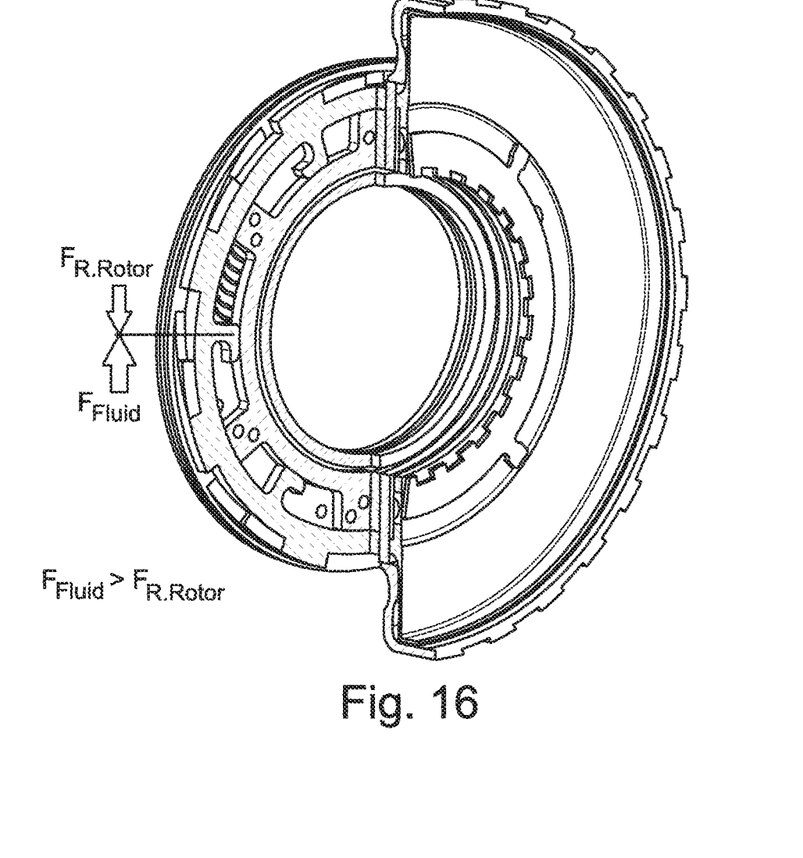
FIG. 16 is a partial section perspective view of the expandable piston assembly of FIG. 6 shown in a closed gap state.
Figure 17:
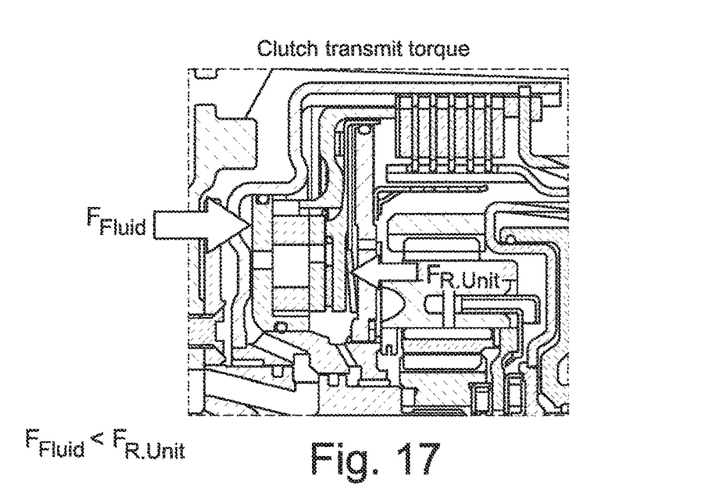
FIG. 17 is a cross section view of the expandable piston assembly of FIG. 6 shown installed in a transmission in a torque transmission state.
Figure 18:
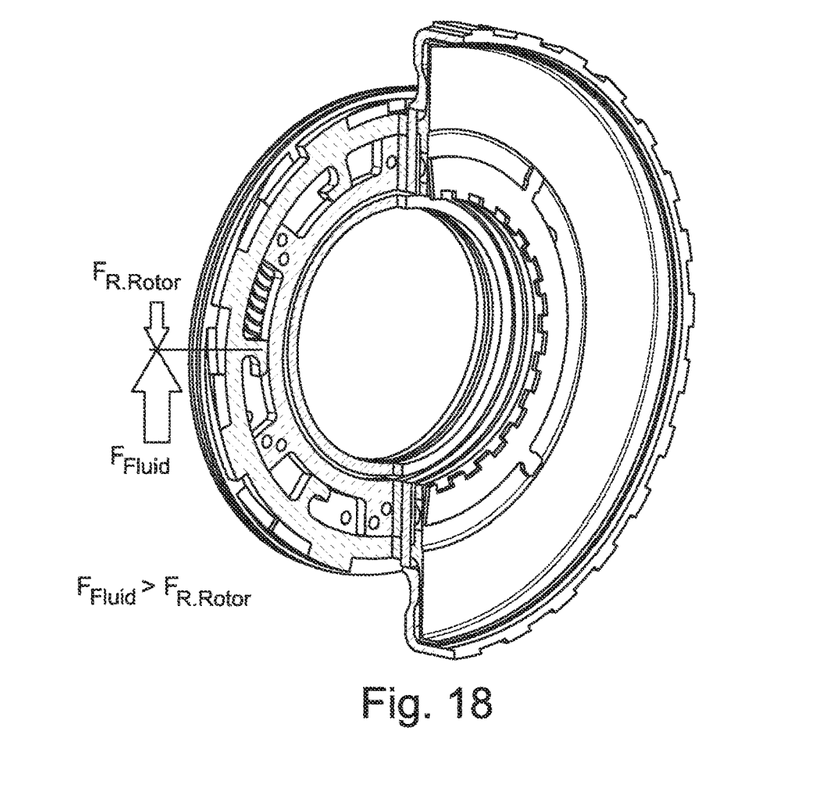
FIG. 18 is a partial section perspective view of the expandable piston assembly of FIG. 6 shown in a torque transmission state.

The following description is made with reference to FIGS. 6-10. FIG. 7 is a partial cutaway side view of expandable piston assembly 300. FIG. 8 is a cross section view of expandable piston assembly 300 taken generally along line 8-8 in FIG. 7. FIG. 9 is a cross section view of expandable piston assembly 300 taken generally along line 9-9 in FIG. 7. FIG. 10 is a cross section view of expandable piston assembly 300 of FIG. 9 shown installed in a transmission. Arcuate segments 324 and 330, radial protrusions 326 and 332, piston 304, and side cover 312 collectively form a portion of chamber 336 for receiving a pressurized hydraulic fluid, to rotate the rotor relative to the stator as described below.

Stator 306 includes radial protrusion 338 with distal end 340 proximate arcuate segment 330. Rotor 308 includes radial protrusion 342 with distal end 344 proximate arcuate segment 324. Arcuate segments 324 and 330, radial protrusions 326 and 342, piston 304, and side cover 312 collectively form a portion of chamber 346. Rotor return springs 350 are disposed in chamber 346.

During operation of expandable piston assembly 302, pressurized hydraulic fluid may be introduced into chamber 336 through hole 358 in the piston. Pressurized fluid in chambers 336 overcomes a spring force from springs 350 in chamber 346 to rotate the rotor relative to the stator and expand the piston assembly as described below. Similarly, side plate 312 includes holes 354 and 156, connected with chambers 346, for flowing hydraulic fluid out of the chambers if there is leakage between a radial protrusion and an arcuate segment, for example. Otherwise stated, piston 304, side plate 312 and rings 324 and 330 form at least a portion of chambers 336 and 346. Chamber 336 is connectable with a hydraulic pressure source via flow holes 354 in piston plate 304. Chamber 346 is connectable with a hydraulic sump via flow holes 356 in side plate 312.

Expandable piston assembly 302 includes compensation dam 358. Side cover 312 is sealed to the compensation dam at seal, or sealing ring, 362, for example. Clutch pack carrier 382 includes integral axially extending tubular sections 384 and 386. Piston plate 304 is installed in and sealed to tubular section 384. Compensation dam 358 is installed in tubular section 386. Rotor 308 includes integral adjuster ring portion 366. Adjuster ring portion 366 includes axially-extending ramp 372. That is, the ramp changes its axial width in a circumferential direction so that a first axial width of the ramp is larger or smaller than a second axial width of the same ramp at a position circumferentially offset from the first axial width. Assembly 302 further includes pressure plate, or load plate, 374 rotationally connected to the side plate by side plate protrusions 368 installed in pressure plate slots 370. Pressure plate 374 includes axially-extending ramp 376 aligned with axially-extending ramp 372. Pressure plate 374 includes radially outer teeth 378 for engaging inner spline 380 of clutch carrier, or clutch pack carrier, 382. Teeth 378 are rotationally fixed to and axially moveable relative to clutch pack carrier inner spline 380.

As best seen in FIG. 10, during an engagement of the clutch pack, pressurized hydraulic oil is introduced to chamber 396 between piston 304 and carrier 382 through flow hole, or apply port, 394 in hub 395. Low pressure oil is also introduced into chamber 398 between the cover 312 and compensation dam 358 via flow hole 392. This keeps oil on both sides of the piston and in chambers 336 and 346 to negate any centrifugal effects. Pressurized oil in chamber 396 flows through holes 358 in the piston into chamber 336. This pressure rotates rotor 308 relative to the stator, piston, side plate, compensation dam, and clutch carrier.

Rotation of the rotor drives rotation of adjuster ring portion 366 relative to pressure plate 374 in direction of arrow 399 (FIG. 1). Pressure plate 374 is rotationally fixed to the clutch carrier by teeth 378 installed in spline 380. Relative rotation of the adjuster ring and pressure plate axially displaces the pressure plate away from the adjuster ring to rapidly close a clutch pack gap or lift off gap (not shown). Once closed and a pressure force acting on the piston overcomes a preload force of release spring 412, pressure on the piston plate clamps the clutch pack (schematically shown by box 381 in FIG. 10) through the rotor adjuster plate portion and pressure plate to fully engage the clutch. Ramps 372 and 376 can be designed with self locking angles such that friction prevents unwinding of the ramps at high axial loads. When pressure is removed, springs 350 rotate the adjuster ring in a direction opposite to arrow 399 (FIG. 1) so that the ramps nest and the pressure plate can move closer to the adjuster ring, opening the clutch. Release springs (i.e., leaf springs) 400 fixed to the pressure plate by fasteners 401 assure that the pressure plate stays tight against the rotor to fully open the clutch when the ramps are nested.

Secondary compensation dam 402 is sealed to the primary compensation dam 358 via seal 404 and includes orifice 406 for release of leaking fluid. Dam 358 advantageously allows pressure compensation while dam 404 exhausts excess fluid. Dam 406 is rotationally fixed to hub 395 via spline connection 408, and axially restricted by snap ring 410. Diaphragm release spring 412 is installed between dams 358 and 404 to fully open the clutch when pressure is removed.

Piston 304 is sealed to the pressure plate via seal 414 and to the hub via seal 416. The rotor is sealed to the piston and side plate by face seals (i.e., lip seals or o-rings) 418 and 420, respectively. The stator is sealed to the piston and side plate by face seals 422 and 424, respectively. The rotor is sealed to the stator via metal pins 426 preloaded by linear springs 428.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch pack assembly for an automatic transmission comprising:
   a clutch pack carrier including an internal spline; and,
   a piston assembly comprising:
      a piston plate sealed to the clutch pack carrier;
      a side plate fixed to the piston plate;
      a vaned actuator installed between the piston plate and the side plate, comprising:
         an inner ring with radially outwardly protruding segments; and,
         an outer ring with radially inwardly protruding segments; and
      a compensation dam, wherein the clutch pack carrier includes an axially extending tubular section, and the piston plate and the compensation dam are installed on the tubular section, and wherein the piston plate includes an inner rim installed on the clutch pack carrier tubular section, and axially protruding tabs extending from the inner rim and in contact with the compensation dam.

2. The clutch pack assembly of claim 1 wherein one of the inner ring or the outer ring is fixed to the piston plate and the other of the inner ring or the outer ring is rotatable relative to the piston plate.

3. The clutch pack assembly of claim 2 further comprising:
   an adjuster ring rotationally fixed to the other of the inner ring or the outer ring; and,
   a pressure plate with radially outer teeth rotationally fixed to and axially moveable relative to the clutch pack carrier internal spline.

4. The clutch pack assembly of claim 1 wherein:
   the side plate and inner and outer rings form at least a portion of plurality of chambers;
   one of the plurality of chambers is connectable with a hydraulic pressure source via flow holes in the piston plate; and,
   another of the plurality of chambers is connectable with a hydraulic sump via flow holes in the side plate.

5. The clutch pack assembly of claim 1 wherein the tubular section includes a first flow hole exiting the tubular section between the inner rim and the compensation dam, and a second flow hole exiting the tubular section on a back side of the piston plate, opposite the inner rim.

* * * * *